(12) United States Patent
Dorn

(10) Patent No.: US 11,198,200 B2
(45) Date of Patent: Dec. 14, 2021

(54) MACHINE SPINDLE ASSEMBLY FOR A MACHINE TOOL

(71) Applicant: Gebr. Heller Maschinenfabrik GmbH, Nürtingen (DE)

(72) Inventor: Thomas Dorn, Reutlingen (DE)

(73) Assignee: GEBR. HELLER MASCHINENFABRIK GMBH, Nürtingen (DE)

( * ) Notice: Subject to any disclaimer, the term of this patent is extended or adjusted under 35 U.S.C. 154(b) by 71 days.

(21) Appl. No.: 16/495,565

(22) PCT Filed: Mar. 14, 2018

(86) PCT No.: PCT/EP2018/056428
§ 371 (c)(1),
(2) Date: Sep. 19, 2019

(87) PCT Pub. No.: WO2018/172160
PCT Pub. Date: Sep. 27, 2018

(65) Prior Publication Data
US 2020/0108477 A1  Apr. 9, 2020

(30) Foreign Application Priority Data

Mar. 20, 2017 (DE) .................... 10 2017 105 934.2

(51) Int. Cl.
*B23Q 1/26* (2006.01)
(52) U.S. Cl.
CPC ..................... *B23Q 1/26* (2013.01)

(58) Field of Classification Search
CPC ...... B23Q 5/04; B23Q 2220/006; B23Q 1/26; B23B 29/034; B23B 29/03432; B23B 29/03467
See application file for complete search history.

(56) References Cited

FOREIGN PATENT DOCUMENTS

| CN | 1162515 A | 10/1997 | |
|---|---|---|---|
| CN | 101518829 A | 9/2009 | |
| CN | 202015840 U | 10/2011 | |
| CN | 103003014 A | 3/2013 | |
| DE | 727151 C | * 10/1942 | ........... B23Q 35/102 |

(Continued)

OTHER PUBLICATIONS

English translation of DE 1602911 A1 (Year: 1970).*

(Continued)

*Primary Examiner* — Alan Snyder
(74) *Attorney, Agent, or Firm* — Cantor Colburn LLP

(57) ABSTRACT

The machine spindle arrangement (22) according to the invention forms a unit with a motor (19) as central element. At one side of the motor (19) a spindle neck (35) with a spindle (32) is flanged that is directly driven by the rotor (28) of the motor (19). The spindle (32) is a so-called null spindle that can be replaced without readjustment with all bearings and other wear parts due to the present exactly adjusted positioning surface (39) that abuts against an axially properly defined bearing contact surface (38). At the backside of the motor (19) facing away from the spindle (32), a tool releasing device (20) and an angle adjustment transmission (21) is arranged that serves to rotate a present traverse feed shaft (42) relative to the spindle (32). The traverse feed shaft (42) serves to actuate an adjustment device at the tool (15).

18 Claims, 2 Drawing Sheets

(56) References Cited

FOREIGN PATENT DOCUMENTS

Figure 1:
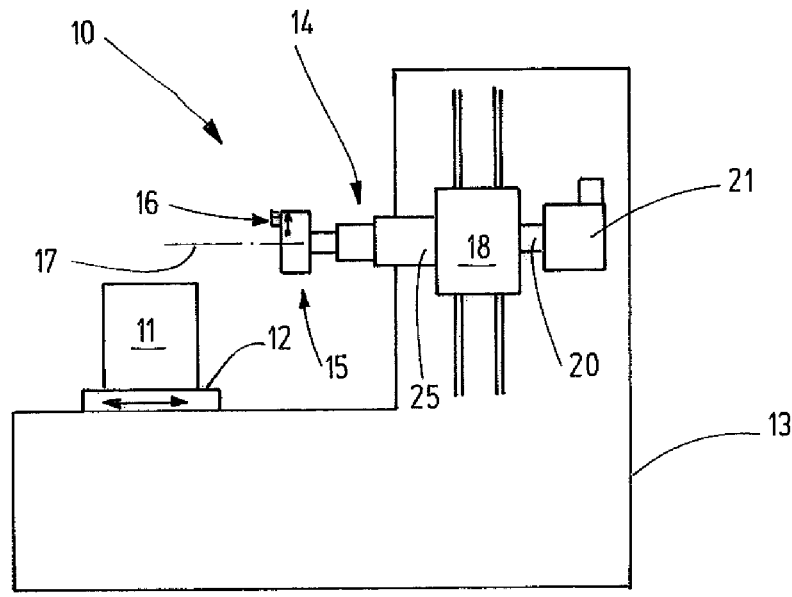

| | | | | |
|---|---|---|---|---|
| DE | 10 43 751 | | 11/1958 | |
| DE | 1602911 A1 | * | 8/1970 | ....... B23B 29/03467 |
| DE | 2143924 A1 | | 3/1973 | |
| DE | 102 008 060 997 A1 | | 6/2010 | |
| DE | 10 2009 031 027 A1 | | 1/2011 | |
| DE | 20 2014 104 118 U1 | | 12/2015 | |
| GB | 2315033 A | | 1/1998 | |
| JP | 59219103 A | * | 12/1984 | ....... B23B 29/03432 |
| JP | 2007-168023 A | | 7/2007 | |

OTHER PUBLICATIONS

China National Intellectual Property Administration, First Office Action, Application No. 201880019473.2, dated Apr. 3, 2020, *with English translation*, 14 pages.

European Patent Office, International Search Report and Written Opinion of the International Searching Authority, Application No. PCT/EP2018/056428, dated Jun. 28, 2018, including English translation of the International Search Report, 11 pages.

German Patent Office, Office Action, Application No. 10 2017 105 934.2, dated Feb. 20, 2018, 7 pages.

German Patent Office, Office Action, Application No. 10 2017 105 934.2, dated Jan. 16, 2018, 10 pages.

German Patent Office, Decision to Grant, Application No. 10 2017 105 934.2, dated Aug. 13, 2018, 8 pages.

\* cited by examiner

MACHINE SPINDLE ASSEMBLY FOR A MACHINE TOOL

The invention relates to a machine spindle arrangement for a machine tool, wherein the machine spindle arrangement comprises a spindle with a replaceable spindle insert, a motor and a traverse feed arrangement, and if applicable additional function and assembly groups.

Machine tools, particularly for chip removing machining of a workpiece, typically contain at least one spindle that is configured to receive a tool. Shank taper tool holding fixtures normally serve for this purpose, in which a tool or tool holder can be inserted in order to guide a tool relative to a workpiece in the space and in doing so to let the tool perform defined movements, e.g. rotating movements. A motor serves for driving, the rotor of which is drivingly connected with the spindle. Typically these components are mounted at a slide that is moveably guided in at least one direction, preferably linearly in order to guide the rotatingly driven tool along a predefined path.

Such a machine spindle arrangement is combined by assembly with the machine tool and forms part thereof. Typically the spindle support is arranged at the slide that also carries the motor. Typically the configuration is quite space requiring. This particularly applies, if the working spindle is provided with a traverse feed arrangement. Such traverse feed arrangements for operating tools are known, such as it can be derived, for example, from DE 44 21 583 A1. The facing head disclosed there is substantially cylindrically configured and comprises radially moveable tools that protrude at the end face. An axially moveable adjustment shaft, guided in the spindle, serves for their movement.

Also DE 10 2014 019 175 A1 discloses a tool with an axially slideable adjustment shaft for radial movement of cutting edges.

But also other tools are known, at which the radial adjustment of the cutting edges is carried out by a relative rotation of an adjustment mechanism with regard to the tool holder. Such tools require a working spindle with a rotatively driven tool holding fixture and a concentric inner spindle that turns synchronously with the working spindle and can be selectively rotated relative to the working spindle for actuating the adjustment apparatus. This inner spindle is called traverse feed shaft. For creating the angle adjustment movement between the working spindle and the traverse feed shaft, a so-called angle adjustment transmission is provided. Typically it is arranged between the working spindle and the motor. Together with the traverse feed shaft it forms a traverse adjustment device.

It is an object of the present invention to provide a machine spindle arrangement for tools with cutting edge adjustment that has improved characteristics.

This object is solved with a machine spindle arrangement according to claim 1:

The machine spindle arrangement according to the invention comprises a motor with a rotatably supported rotor and a stator, wherein the rotor is torque-proof connected with the spindle and thus serves as direct drive for the spindle. The spindle is rotatably supported in a spindle neck that is flanged to the stator of the motor. Particularly between the spindle neck and the motor no other functional assembly group is provided, such that a particular rigid and vibration-resistant configuration of the spindle neck and thus a rigid, low vibration support of the spindle is provided.

The spindle and the rotor, that is torque-proof coupled with it, comprise an axial passage through which the traverse feed shaft extends that is arranged concentrically to the spindle. Additionally, an axially shiftably supported releasing sleeve can extend through the passage that surrounds the traverse feed shaft and serves to fix and release a tool in the tool holding fixture of the spindle. This releasing sleeve can be torque-proof connected with the rotor, in order to not carry out a relative rotation with regard to it.

For relative rotation of the traverse feed shaft relative to the spindle an angle adjustment transmission is provided that is supported at the side of the motor facing away from the spindle neck. With the traverse feed drive a rotating speed independent angle rotation between the spindle and the traverse feed shaft can be effectuated during rotation of the spindle. Particularly the spindle that has to transmit the tool-driving torque is directly connected to the rotor by a short way, whereas the traverse feed shaft that has to transmit only small adjustment torques, if applicable, is connected with the angle adjustment transmission or the spindle along a longer way. In doing so, a very compact, rigid and concurrently slim configuration is achieved.

The machine spindle arrangement comprises an axial bearing contact surface in the spindle neck, to which an axial positioning surface of the spindle insert is assigned. The axial positioning surface and the spindle contact surface are attuned with regard to each other, such that the axial positioning of the spindle insert is example-independent effective with high accuracy. Thus, all of the parts subject to wear including bearing, tooling holding fixture, elements provided in the tool holding fixture, like clamping elements, springs and the like, are replaceable in simple manner.

The spindle bearing device preferably comprises at least one axial bearing component and at least one radial bearing component. The positioning surface belongs to the axial bearing component that obtains its contact and position in the assembled condition at the bearing contact surface of the spindle neck.

The rotor comprises a rotor bearing device that is particularly configured as radial bearing device. Axial forces resulting from the tool and the tool-workpiece-engagement are supported by the bearing of the spindle insert and preferably not transmitted from the spindle to the rotor. For this purpose a form fit coupling, e.g. a denture clutch with low rotational clearance, is provided between the spindle insert and the rotor that allows an axial relative movement between the rotor and the spindle insert.

A form fit switchable coupling device can be provided between the rotor and the traverse feed shaft that is configured to selectively couple the traverse feed shaft and the rotor by form fit or release a relative rotation. The coupling device can be engaged and disengaged, e.g. by an axial movement of the traverse feed shaft. In coupled condition a totally synchronous rotation of the spindle insert and the traverse feed shaft is ensured. Also unexpected changes of the rotational speed, as for example due to power breakdown, emergency shutdown or the like, do not lead to an uncontrolled relative movement and thus an uncontrolled radial adjustment of components at the tool.

If the spindle neck is directly flanged at first face of the stator and supported by it, the compactness, low vibration and the centering of the masses that are present at the machine spindle arrangement benefit therefrom. It is further an advantage, if the angle adjustment transmission and releasing unit for the tool holding fixture, if applicable, are arranged at the other face of the stator facing away from the spindle neck. The center of mass of this machine spindle arrangement is then substantially positioned in the inside of the motor, thus also quick adjustment movements of the machine spindle arrangement with high accuracy and without excitation of unhealthful vibrations can be executed.

Preferably the machine spindle arrangement forms insofar a pre-assembled unit that can be connected or released from a machine slide as a whole. For connection the motor comprises a connection surface for fixing the machine spindle arrangement radially and axially at the machine slide. Additionally, the spindle neck can comprise a support surface for radially supporting at the machine slide, e.g. in order to directly transfer machining forces into the machine slide. The support surface can be a circumferential surface of the spindle neck.

Figure 2:
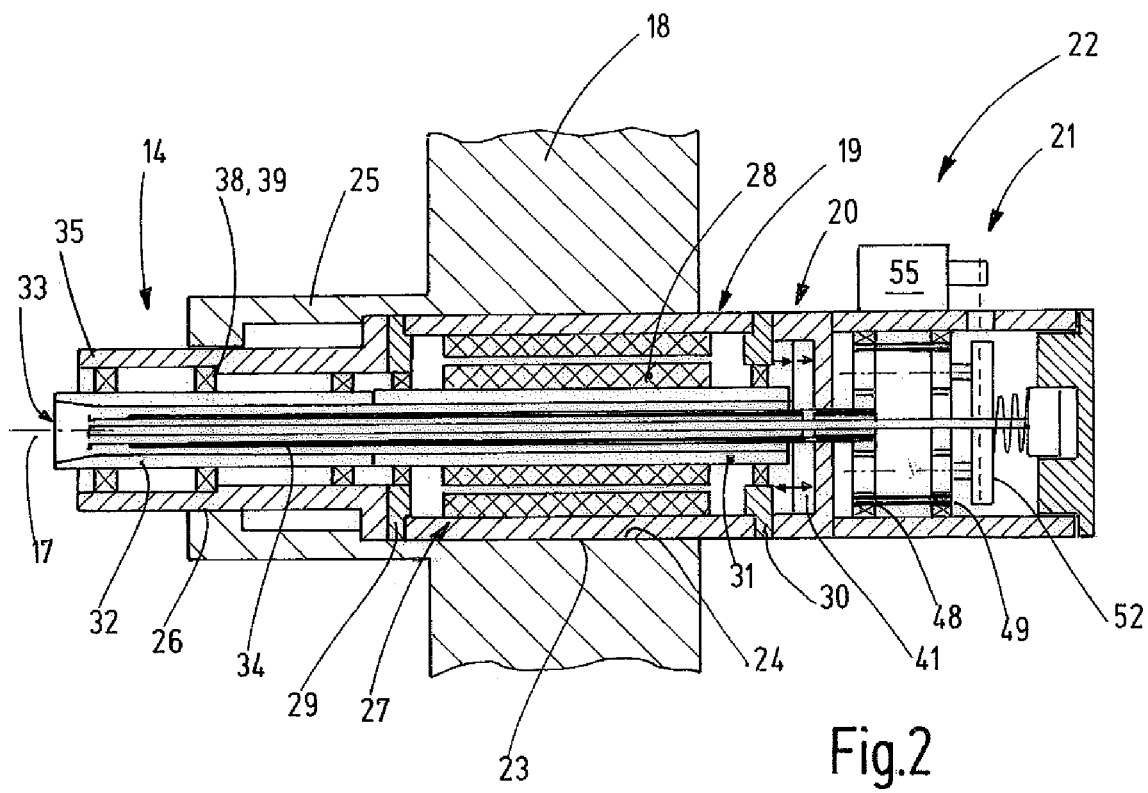
Figure 3:
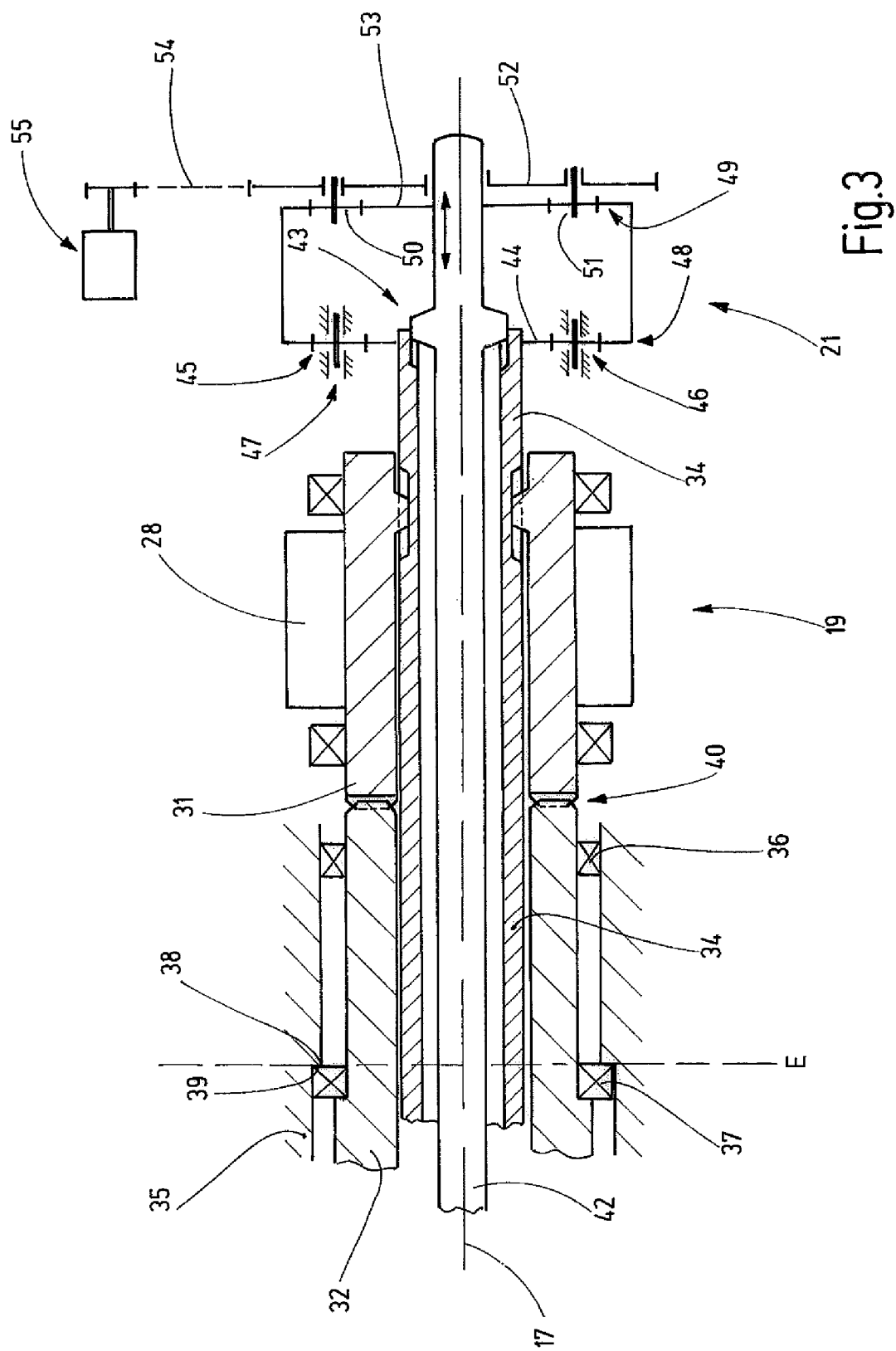

Further details of advantageous embodiments of the invention are subject of the drawings, the description or of claims. It shows:

FIG. 1 a machine tool in a schematic simplified illustration,

FIG. 2 a machine spindle of the machine tool according to FIG. 1 in a schematic partly sectional illustration, FIG. 3 a principle illustration of components of the machine spindle according to FIG. 2.

FIG. 1 illustrates a machine tool 10 that serves for chipping machining of workpieces 11. For this the workpiece 11 illustrated symbolically in FIG. 1 by a rectangle is clamped on a workpiece table 12 that is fixed or moveably supported by a machine frame 13. The workpiece table 12 can be arranged linearly and/or rotatably moveable about one or more horizontal and/or vertical axes respectively.

Tools that serve for machining of the workpiece 11 are typically stored in a tool magazine and can be inserted and replaced by suitable means in a machine spindle 14. In FIG. 1 a spindle head is shown as tool 15 that comprises at least one radially adjustable cutting edge 16. The radial adjustability is illustrated in FIG. 1 by means of a flash that is orientated radial to the rotation axis 17.

The machine spindle 14 is configured to rotate the tool 15 and to selectively adjust the cutting edge 16 radially, if needed. Also other tools with radial adjustment of grinding or cutting elements can be received by the machine spindle 14.

The machine spindle 14 is supported by a slide 18 that, together with the machine spindle 14, has additional elements, like for example a motor 19, a tool releasing device 20 and/or an angle adjustment transmission 21, as it is illustrated in FIG. 2. The spindle 14, the motor 19, the tool releasing device 20 and the angle adjustment transmission 21 form a machine spindle arrangement that defines an individual unit 22.

The unit 22 comprises a connection surface 23 that is preferably arranged at the outer circumference of the motor 20. The surface extends preferably around the motor 19, wherein it can be formed continuously or with interruptions. The connection surface 23 can be a cylinder surface or also a surface that has a different cross-section, e.g. a polygonal cross-section. It serves to radially and axially fix the unit 22, wherein the slide 18 comprises a respective seating surface 24 matching with the connection surface 23. Due to the rigid support and holding of the motor 19 at its connection surface 23, the whole unit formed by the machine spindle arrangement 22 is fixedly supported. Additionally, the slide 18 can comprise a tube-shaped extension 25 or any other holder that receives a part of the machine spindle 14 and supports it in radial direction. For this the machine spindle 14 can comprise a support surface 26 that is formed by a section of the peripheral surface of the machine spindle 14.

As central and supporting element the machine spindle arrangement 22 comprises the motor 19 containing a stator 27 and a rotor 28. The motor 19 can be configured as synchronous motor, asynchronous motor, direct current motor or any other electric motor, wherein it is configured with regard to power, rotational speed and torque for the drive of the tool 15 without intermediate transmission (transmissionless direct drive). The rotor 28 comprises a supported hollow shaft 31 that is preferably supported by roller bearings at front side bearing shields 29, 30, wherein the hollow shaft 31 is coupled with a spindle 32 inside the working area and thus at the side facing the tool 15. The spindle 32 and the hollow shaft 31 are both concentrically arranged to the same rotating axis 17. For torque-proof coupling of the hollow shaft 31 and the spindle 32 any suitable coupling means can be used that effectuates a torque-proof coupling and concurrently allows at least small radial and/or axial equalizing movements, as e.g. cylindrical gear toothing, spline toothing or the like.

The spindle 32 is configured hollowly and comprises at its end facing away from the motor 19 a tool holding fixture 33 that is, for example, suitable for receiving hollow shank tapers or otherwise standardized tool couplings or couplings of tool holders. A releasing shaft 34 serves for locking such tools in the tool holding fixture 33, wherein the releasing shaft 34 is tube-like configured and extends through the hollow shaft 31 of the rotor 28 as well as through the spindle 32. The releasing shaft 34 that is particularly also illustrated in FIG. 3, carries connection means for coupling at a respective coupling structure of the tool or the tool holder in the region of the tool holding fixture 33. The releasing shaft 34 is biased away from the tool holding fixture 33 by not illustrated spring means. For releasing of the tool the releasing shaft 34 is moved by means of the tool releasing device 20 in direction toward the tool (to the left in FIG. 2).

The spindle 32 is rotatably supported by a plurality of bearings, particularly roller bearings, in the spindle neck 35. This spindle neck 35 is rigidly screwed with the stator 27 of the motor. In a preferred embodiment a disc flange of the spindle neck 35 directly adjoins the tool side face of the motor 19 that is formed in the embodiment by the bearing shield 29 or another structure ending the stator 27. Due to this configuration, an optimized alignment of the spindle 32 and the hollow shaft 31 to the rotating axis 17 and a very compact construction is achieved.

Together with two bearings 36, 37 the spindle 32 and, as appropriate, additional parts connected with the spindle 32, forms a spindle insert that can be replaced as wear part as a whole, e.g. if wear of the bearing or wear of the tool holding fixture 33 occurs. Because the axial position of the spindle 32 defines the position of the tool cutting edges of received tools, it is decisive that the spindle 32 comprises the same axial position as the spindle that was formerly received by the spindle neck 35 independent of eventual production tolerances. For this reason the spindle neck 35 comprises an axial bearing contact surface 38 that can be formed, for example by a ring-shaped planar surface at a step of the inner passage of the spindle neck 35. The bearing contact surface 38 serves for axial contact of the bearing 37 that can be the axial bearing component of the complete bearing device formed by the bearings 36, 37. An axial positioning surface 39 is assigned to the axial bearing contact surface 38 that is directly formed at the bearing 37 or at shims or adjusting rings that can be positioned between the bearing 37 and the bearing contact surface 38. By a respectively positioned axial arrangement of the positioning surface 39 it is ensured that the spindle insert can be exchanged without the need to recalibrate the machine tool subsequently.

Between the spindle 32 and the rotor 28 or its hollow shaft 31 a torque-proof coupling device 40 is arranged that can, for example be formed by engaging cylindrical toothing of the spindle 32 and the hollow shaft 31. This coupling device 40 allows slight axial and/or radial-relative movements, such that the axial position of the spindle 32 is defined solely by the positioning surface 39 and the axial contact surface 38.

The tube-like configured releasing shaft 34 extends through the spindle 32 and the hollow shaft 31, wherein the releasing shaft 34 is axially moveable, whereas it is preferably torque-proof coupled with the hollow shaft 31 and/or the spindle 32. Assigned to the releasing shaft 34 is an actuator 41 that is symbolically shown in FIG. 2, which can be formed by a pressurized air cylinder and form part of the tool releasing device 20. The hollow shaft 31 and the spindle 32 delimit an axial passage, for which a traverse feed shaft 42 extends that is concentrically arranged to the rotating axis 17. The traverse feed shaft 42 extends concurrently through the releasing shaft 34 that is in the axial passage of the hollow shaft 31 and the spindle 32. The traverse feed shaft 42 and the releasing shaft 34 are arranged coaxially with regard to each other.

The traverse feed shaft 42 can be torque-proof coupled with the hollow shaft 31 of the rotor 28 by a switchable coupling device 43. The torque transmission can be provided via the releasing shaft 34, i.e. the coupling device 43 can be effectively arranged between the releasing shaft 34 and the traverse feed shaft 42, if the releasing shaft 34 is torque-proof connected with the hollow shaft 31. In doing so, the releasing shaft 34 can comprise an inner profile toothing at one end, with which profile teeth of the traverse feed shaft 42 can be engaged and disengaged by shifting the traverse feed shaft 42 axially back and forth accordingly.

If the coupling device 43 is coupled, the traverse feed shaft 42 rotates synchronously with the spindle 32. If the coupling device 43 is, however, decoupled, the angle adjustment transmission 21 defines the rotation of the traverse feed shaft 42. The angle adjustment transmission 21 is a planetary gearing with two planetary gear sets. A sun wheel 44 that is torque-proof connected with the rotor 28 as well as at least one and preferably a plurality of planetary wheels 45, 46, that are supported at a non-rotatably supported planetary carrier 47, belong to a first planetary gear set. With view from the spindle 32 the planetary carrier 47 is arranged behind the motor 19. The planetary wheels 45, 46 mesh with a hollow wheel 48 that is torque-proof connected with a second hollow wheel 49 having preferably the same size. It belongs to a second planetary gear set, the planetary wheels 50, 51 thereof are rotatably supported at a planetary carrier 52 that is concentrically rotatably supported about the rotation axis 17. The planetary wheels 50, 51 are preferably as large as the planetary wheels 45, 46. They mesh with a sun wheel 53 that is preferably as large as the first sun wheel 44. The planetary carrier 52 is coupled with an adjustment motor 55 via a transmission connection, e.g. via a chain or belt drive 54.

The function principle of the spindle unit partly illustrated in FIG. 3 is as follows:

If the clutch 43 is engaged, the spindle 32 and the traverse feed shaft 42 rotate synchronously with the same speed of rotation in a fixed angle reference with regard to each other. In doing so, cutting edges 16 provided at the tool 15 are not adjusted in radial direction.

If during operation a radial adjustment of the cutting edge 16 shall be carried out, first the coupling device 43 is disengaged. An angle adjustment of the rotating spindle 32 and the rotating traverse feed shaft 42 relative to each other does, however, not occur as long as the planetary carrier 52 does not rotate. The sun wheel 44 drives the hollow wheel 48 via the planetary wheels 45, 46 that cycles in counter direction. The hollow wheel 49 that is entrained in the same direction now drives the sun wheel 53 via the planetary wheels 50, 51 that, therefore, rotates synchronously with the sun wheel 44.

However, as soon as the adjusting motor 55 adjusts the planetary carrier 52 in rotating direction, this angle adjustment movement is superimposed with the rotating movement of the traverse feed shaft 42, such that while continuing rotating with a slightly modified speed of rotation relative to the spindle 32 is subject to an angle adjustment relative to the spindle 32. This angle adjustment stops as soon as the adjustment motor 55 is stopped, the speed of rotations of the spindle 32 and the traverse feed shaft 42 are then equal again. Due to the rotation, i.e. angle adjustment, actuated by the adjustment motor 55 via the angle adjustment transmission 21 additional to the existing rotation of the traverse feed shaft 42, the cutting edge 16 is adjusted in radial direction.

The machine spindle arrangement 22 according to the invention forms a unit with a motor 19 as central element. At one side of the motor 19 a spindle neck 35 with a spindle 32 is flanged that is directly driven by the rotor 28 of the motor 19. The spindle 32 is a so-called null spindle that can be replaced without readjustment with all bearings and other wear parts due to the present exactly adjusted positioning surface 39 that abuts against an axially properly defined bearing contact surface 38. At the backside of the motor 19 facing away from the spindle 32, a tool releasing device 20 and an angle adjustment transmission 21 is arranged that serves to rotate a present traverse feed shaft 42 relative to the spindle 32. The traverse feed shaft 42 serves to actuate an adjustment device at the tool 15.

| List of reference signs: | |
|---|---|
| 10 | Machine tool |
| 11 | Workpiece |
| 12 | Workpiece table |
| 13 | Machine frame |
| 14 | Machine spindle |
| 15 | Tool |
| 16 | Cutting edge |
| 17 | Rotation axis |
| 18 | Slide |
| 19 | Motor |
| 20 | Tool releasing device |
| 21 | Angle adjustment transmission |
| 22 | Machine spindle arrangement |
| 23 | Connection surface |
| 24 | Seating surface |
| 25 | Extension |
| 26 | Support surface |
| 27 | Stator |
| 28 | Rotor |
| 29, 30 | Bearing shields |
| 31 | Hollow shaft |
| 32 | Spindle |
| 33 | Tool holding fixture |
| 34 | Releasing shaft |
| 35 | Spindle neck |
| 36, 37 | Bearing |
| 38 | Bearing contact surface |
| 39 | Positioning surface |
| 40 | Coupling device |
| 41 | Actuator |
| 42 | Traverse feed shaft |
| 43 | Coupling device |
| 44 | First sun wheel |
| 45, 46 | First planetary wheels |

| List of reference signs: | |
|---|---|
| 47 | First planetary carrier |
| 48, 49 | First and second hollow wheel |
| 50, 51 | Second planetary wheels |
| 52 | Second planetary carrier |
| 53 | Second sun wheel |
| 54 | Transmission means |
| 55 | Adjustment motor |

The invention claimed is:

1. A machine spindle arrangement for a machine tool comprising:
- a motor having a rotor with a concentric rotor passage opening, the rotor being rotatably supported about a rotating axis and a stator with a spindle neck that is flanged to the stator of the motor and having an axial bearing contact surface;
- a replaceable spindle insert having a spindle with a tool holding fixture and a spindle bearing device with an axial positioning surface that is assigned to make contact with the axial bearing contact surface in order to effectuate an axial positioning of the spindle insert, wherein the spindle includes a centric spindle passage opening with a traverse feed shaft that extends through the spindle passage opening and the rotor passage opening; and
- an angle adjustment transmission that is connected at the side of the stator away from the spindle neck and connectable with the rotor as well as the traverse feed shaft, with a traverse feed drive that is configured to effectuate an angular rotation between the spindle and the traverse feed shaft independent from a speed of rotation between the spindle and the traverse feed shaft.

2. The machine spindle arrangement according to claim 1, wherein the spindle neck comprises a passage channel that is concentrically arranged to the rotation axis.

3. The machine spindle arrangement according to claim 1, wherein the spindle bearing device comprises at least one axial bearing component and at least one radial bearing component.

4. The machine spindle arrangement according to claim 1, wherein the rotor comprises a rotor bearing device that comprises at least a radial bearing component.

5. The machine spindle arrangement according to claim 1, further comprising a form fit coupling device provided between the spindle and the rotor.

6. The machine spindle arrangement according to claim 1, further comprising a form fit switchable coupling device between the rotor of the motor and the traverse feed shaft that is configured to allow or lock a relative rotation between the traverse feed shaft and the rotor.

7. The machine spindle arrangement according to claim 6, wherein the traverse feed shaft is axially adjustably supported in order to engage and disengage the coupling device.

8. The machine spindle arrangement according to claim 1, wherein the spindle neck is directly flanged at a first face of the stator and supported by it.

9. The machine spindle arrangement according to claim 1, further comprising a releasing unit for the tool holding fixture provided between the stator and the angle adjustment transmission.

10. The machine spindle arrangement according to claim 9, wherein the releasing unit is directly flanged at a second face of the stator and the releasing unit supports the angle adjustment transmission.

11. The machine spindle arrangement according to claim 1, wherein the machine spindle arrangement forms a pre-assembled unit that is configured to be received in a machine slide.

12. The machine spindle arrangement according to claim 1, wherein the stator of the motor comprises a connection surface for radially and axially fixing the machine spindle arrangement at a machine slide.

13. The machine spindle arrangement according to claim 12, wherein the connection surface is a circumferential surface of the stator.

14. The machine spindle arrangement according to claim 1, wherein the spindle neck comprises a support surface for radially supporting the spindle neck at a machine slide.

15. The machine spindle arrangement according to claim 14, wherein the support surface is a circumferential surface of the spindle neck.

16. The machine spindle arrangement according to claim 1, wherein the rotor comprises a hollow shaft, and the spindle and the hollow shaft are concentrically arranged around the rotating axis.

17. The machine spindle arrangement according to claim 16, wherein a torque-proof coupling is provided between the hollow shaft and the spindle.

18. The machine spindle arrangement according to claim 17, wherein the torque-proof coupling allows radial and/or axial movements between the hollow shaft and the spindle such that a position of the spindle is defined solely by the axial positioning surface and the axial bearing contact surface.

* * * * *